United States Patent
Liu et al.

(10) Patent No.: US 11,120,652 B2
(45) Date of Patent: Sep. 14, 2021

(54) METHOD AND SYSTEM FOR GRAPHICALLY DISPLAYING DATA STREAM, AND VEHICLE DIAGNOSTIC DEVICE

(71) Applicant: SHENZHEN LAUNCH SOFTWARE CO., LTD., Guangdong (CN)

(72) Inventors: Jun Liu, Guangdong (CN); Chunwu Deng, Guangdong (CN); Zewei Wei, Guangdong (CN)

(73) Assignee: SHENZHEN LAUNCH SOFTWARE CO., LTD., Shenzhen (CN)

(*) Notice: Subject to any disclaimer, the term of this patent is extended or adjusted under 35 U.S.C. 154(b) by 289 days.

(21) Appl. No.: 16/297,905

(22) Filed: Mar. 11, 2019

(65) Prior Publication Data

US 2019/0295339 A1 Sep. 26, 2019

Related U.S. Application Data

(63) Continuation-in-part of application No. PCT/CN2018/079834, filed on Mar. 21, 2018.

(51) Int. Cl.
*G07C 5/12* (2006.01)
*G06F 3/0484* (2013.01)
*G07C 5/08* (2006.01)

(52) U.S. Cl.
CPC ............ *G07C 5/12* (2013.01); *G06F 3/0484* (2013.01); *G07C 5/0841* (2013.01); *G06F 2203/04806* (2013.01)

(58) Field of Classification Search
CPC ...... G07C 5/12; G07C 5/0841; G07C 5/0816; G07C 5/08; G07C 5/0808; G06F 3/0484; G06F 2203/04806; G05B 23/0221

(Continued)

(56) References Cited

U.S. PATENT DOCUMENTS 5,691,692 A * 11/1997 Herbstritt ................ F02B 63/00
123/198 D
5,839,096 A * 11/1998 Lyons .................. G01S 7/4052
702/183

(Continued)

FOREIGN PATENT DOCUMENTS

CN 101237765 8/2008
CN 102073319 5/2011

(Continued)

OTHER PUBLICATIONS

Chinese Office action filed in 201880000170.6 dated Jul. 1, 2020.

(Continued)

*Primary Examiner* — Muhammad Shafi
(74) *Attorney, Agent, or Firm* — Rankin, Hill & Clark LLP

(57) ABSTRACT

The present application is applicable to the technical field of vehicle diagnosis, and provides a method and a system for graphically displaying a data stream and a vehicle diagnostic device. The method comprises: receiving and storing diagnostic data; graphically displaying the diagnostic data within a display range according to the display range set by a user; and receiving a zoom-in instruction or a zoom-out instruction sent by the user, zooming in or zooming out the display range according to a preset condition, and graphically displaying the diagnostic data within a zoomed in or zoomed out display range. In this process, the user can randomly zoom in and zoom out a displayed graph, which helps the user to comparatively look over different diagnostic data received within a long period of time so as to rapidly discover a fault or find out a fault cause.

14 Claims, 3 Drawing Sheets

(58) Field of Classification Search
USPC .......................................................... 701/29
See application file for complete search history.

(56) References Cited

U.S. PATENT DOCUMENTS

| | | | | |
|---|---|---|---|---|
| 6,091,324 A * | 7/2000 | Arsenault | ............... | G01K 15/00 |
| | | | | 340/449 |
| 6,134,488 A * | 10/2000 | Sasaki | .................... | B60K 23/00 |
| | | | | 701/32.8 |
| 2014/0075356 A1* | 3/2014 | Gray | ..................... | G07C 5/008 |
| | | | | 715/771 |

FOREIGN PATENT DOCUMENTS

| | | |
|---|---|---|
| CN | 102510317 | 6/2012 |
| CN | 104755899 | 7/2015 |
| CN | 105518431 | 4/2016 |
| CN | 105574594 | 5/2016 |
| CN | 106126102 | 11/2016 |
| CN | 108052088 | 5/2018 |
| EP | 0394163 | 6/1995 |

OTHER PUBLICATIONS

Supplemental European Search Report filed in EP 18822248 dated Feb. 14, 2020.
International Search Report filed in PCT/CN2018/079834 dated Dec. 25, 2018.

* cited by examiner

METHOD AND SYSTEM FOR GRAPHICALLY DISPLAYING DATA STREAM, AND VEHICLE DIAGNOSTIC DEVICE

TECHNICAL FIELD

The present disclosure pertains to the technical field of vehicle diagnosis, and particularly, to a method and a system for graphically displaying a data stream, and a vehicle diagnostic device.

BACKGROUND

A vehicle diagnostic device, that is, vehicle fault diagnostic equipment, is a portable intelligent vehicle fault self-diagnosis equipment configured to detect a fault of a vehicle. A user can use the vehicle fault diagnostic equipment to read a fault in an electronic control system, and display fault information via a liquid crystal display, to check a location and a cause of the fault. When performing fault diagnosis, the vehicle diagnostic device firstly reads a data stream of the vehicle, and then displays the data stream in a form of graph. However, when the data stream is displayed by the vehicle diagnostic equipment graphically, a graph formed by little data can merely be displayed generally, and a requirement of a user for looking over the graph comparatively cannot be met.

Technical Problem

In view of this, embodiments of the present disclosure provide a method and a system for graphically displaying a data stream and a vehicle diagnostic device, which aims at solving a problem in related art that a data stream graph displayed by the vehicle diagnostic device cannot meet a requirement of a user for looking over the graph comparatively.

Technical Solution

A first aspect of embodiments of the present disclosure provides a method for graphically displaying a data stream. The method for graphically displaying a data stream comprises:

receiving and storing diagnostic data;

graphically displaying diagnostic data within a display range based on the display range set by a user; and receiving a zoom-in instruction or a zoom-out instruction sent by the user, zooming in or zooming out the display range according to a preset condition, and graphically displaying diagnostic data within a zoomed in or zoomed out display range.

Further, the step of receiving and storing diagnostic data comprises:

receiving diagnostic data of a current moment; and deleting a first piece of diagnostic data from a data sequence formed by stored diagnostic data, and adding the diagnostic data of the current moment to an end of the data sequence if the quantity of the stored diagnostic data is the same as a preset quantity; or adding the diagnostic data of the current moment to an end of a data sequence formed by the stored diagnostic data if the quantity of the stored diagnostic data is less than the preset quantity, and increasing the quantity of the stored diagnostic data by 1.

Furthermore, the step of graphically displaying the diagnostic data within a display range based on the display range set by a user comprises:

obtaining the display range set by the user, wherein the display range includes the quantity of diagnostic data to be displayed; and if the quantity of currently stored diagnostic data is greater than the display range set by the user, displaying a graph within the display range set by the user by taking a difference between the quantity of the currently stored diagnostic data and the quantity of diagnostic data within the display range as a starting point on an X axis, taking a value of the quantity of the currently stored diagnostic data as a maximum displayed value on the X axis, and taking corresponding diagnostic data received each time as a value on a Y axis.

Furthermore, the step of graphically displaying the diagnostic data within a display range based on the display range set by a user comprises:

if the quantity of currently stored diagnostic data is not greater than the display range set by the user, displaying a graph in the display range set by the user by taking a zero point as a starting point on an X axis, taking a value of the quantity of the currently stored diagnostic data as a maximum displayed value on the X axis, and taking corresponding diagnostic data received each time as a value on a Y axis.

Furthermore, the step of zooming in or zooming out the display range according to a preset condition comprises:

determining whether the display range is a maximum display range when receiving the zoom-in instruction sent by the user; and zooming in the display range to a preset multiple if the display range is not the maximum display range; or determining whether the display range is a minimum display range when receiving the zoom-out instruction sent by the user; and zooming out the display range to 1/N of an original display range if the display range is not the minimum display range, wherein N is a positive integer greater than 1 and preset by the user.

A second aspect of embodiments of the present disclosure provides a vehicle diagnostic device, including: a memory, a processor, and a computer program stored in the memory and executable on the processor, where the processor is configured to execute the computer program to implement steps of receiving and storing diagnostic data; graphically displaying diagnostic data within a display range according to the display range set by a user; and receiving a zoom-in instruction or a zoom-out instruction sent by the user, zooming in or zooming out the display range according to a preset condition, and graphically displaying diagnostic data within a zoomed in or zoomed out display range.

Furthermore, the processor is further configured to implement the step of receiving and storing diagnostic data by:

receiving diagnostic data of a current moment;

deleting a first piece of diagnostic data from a data sequence formed by a stored diagnostic data, and adding the diagnostic data of the current moment to an end of the data sequence if the quantity of the stored diagnostic data is the same as a preset quantity; and adding the diagnostic data of the current moment to an end of a data sequence formed by the stored diagnostic data and increasing the quantity of the stored diagnostic data by 1, if the quantity of the stored diagnostic data is less than the preset quantity.

Furthermore, the processor is further configured to implement the step of graphically displaying the diagnostic data according to the display range set by a user by obtaining the display range set by the user, wherein the display range comprises the quantity of diagnostic data to be displayed; and displaying a graph set by the user by taking a difference between the quantity of the currently stored diagnostic data and the quantity of the diagnostic data in the display range as a starting point on an X axis, taking a value of the quantity of the currently stored diagnostic data as a maximum displayed value on the X axis, and taking corresponding diagnostic data received each time as a value on a Y axis, if the quantity of currently stored diagnostic data is greater than the display range set by the user.

Furthermore, the processor is further configured to implement the step of graphically displaying the diagnostic data according to the display range set by a user by displaying a graph within the display range set by the user by taking a zero point as a starting point on an X axis, taking a value of the quantity of the currently stored diagnostic data as a maximum displayed value on the X axis, and taking corresponding diagnostic data received each time as a value on a Y axis, if a quantity of currently stored diagnostic data is not greater than the display range set by the user.

Furthermore, the processor is further configured to implement the step of zooming in or zooming out the display range according to a preset condition by determining whether the display range is a maximum display range when receiving the zoom-in instruction sent by the user; and zooming in the display range to a preset multiple if the display range is not the maximum display range; or determining whether the display range is a minimum display range when receiving the zoom-out instruction sent by the user;

zooming out the display range to 1/N of an original display range if the display range is not the minimum display range, where N is a positive integer greater than 1 and preset by the user.

A third aspect of the present disclosure provides a computer readable storage medium which stores a computer program, where a processor is configured to execute the computer program to implement steps of receiving and storing diagnostic data; graphically displaying diagnostic data within a display range according to the display range set by a user; and receiving a zoom-in instruction or a zoom-out instruction sent by the user, zooming in or zooming out the display range according to a preset condition, and graphically displaying diagnostic data within a zoomed in or zoomed out display range.

Furthermore, the processor is further configured to implement the step of receiving and storing diagnostic data by:

receiving diagnostic data of a current moment;

deleting a first piece of diagnostic data from a data sequence formed by a stored diagnostic data, and adding the diagnostic data of the current moment to an end of the data sequence if the quantity of the stored diagnostic data is the same as a preset quantity; and adding the diagnostic data of the current moment to an end of a data sequence formed by the stored diagnostic data and increasing the quantity of the stored diagnostic data by 1, if the quantity of the stored diagnostic data is less than the preset quantity.

Furthermore, the processor is further configured to implement the step of graphically displaying the diagnostic data according to the display range set by a user by obtaining the display range set by the user, wherein the display range comprises the quantity of diagnostic data to be displayed; and displaying a graph set by the user by taking a difference between the quantity of the currently stored diagnostic data and the quantity of the diagnostic data in the display range as a starting point on an X axis, taking a value of the quantity of the currently stored diagnostic data as a maximum displayed value on the X axis, and taking corresponding diagnostic data received each time as a value on a Y axis, if the quantity of currently stored diagnostic data is greater than the display range set by the user.

Furthermore, the processor is further configured to implement the step of graphically displaying the diagnostic data according to the display range set by a user by displaying a graph within the display range set by the user by taking a zero point as a starting point on an X axis, taking a value of the quantity of the currently stored diagnostic data as a maximum displayed value on the X axis, and taking corresponding diagnostic data received each time as a value on a Y axis, if a quantity of currently stored diagnostic data is not greater than the display range set by the user.

Furthermore, the processor is further configured to implement the step of zooming in or zooming out the display range according to a preset condition by determining whether the display range is a maximum display range when receiving the zoom-in instruction sent by the user; and zooming in the display range to a preset multiple if the display range is not the maximum display range; or determining whether the display range is a minimum display range when receiving the zoom-out instruction sent by the user;

zooming out the display range to 1/N of an original display range if the display range is not the minimum display range, where N is a positive integer greater than 1 and preset by the user.

Advantageous Effects

In a system for graphically displaying a data stream according to the embodiments of the present disclosure, a vehicle diagnostic device is connected to a vehicle, and receives diagnostic data sent by the automobile, and then obtains a display range set by a user, and graphically displays diagnostic data within the display range set by the user; when receiving a zoom-in instruction or a zoom-out instruction sent by the user, the display range set by the user is zoomed in or zoomed out according to a condition preset by the user and the diagnostic data within a zoomed in or zoomed out display range is displayed. In this process, the vehicle diagnostic device may store a large quantity of received diagnostic data and display diagnostic data of different areas in a graph according to the display range set by the user. Moreover, the display range may be changed according to the zoom-in instruction or the zoom-out instruction of the user, such that the user can randomly zoom in and zoom out a displayed graph, which helps the user to comparatively look over different diagnostic data received within a long period of time, so as to rapidly discover a fault or find a fault cause.

BRIEF DESCRIPTION OF DRAWINGS

In order to describe the technical solutions in the embodiments of the present disclosure more clearly, the accompanying drawings required for describing the embodiments or the prior art are briefly described.

DESCRIPTION OF EMBODIMENTS

In a system for graphically displaying a data stream according to embodiments of the present disclosure, an vehicle diagnostic device is connected to a vehicle, and receives diagnostic data sent by the automobile, and then obtains a display range set by a user, and graphically displays diagnostic data within the display range set by the user; and zooms in or zooms out, based on a condition preset by the user, the display range set by the user, and displays the diagnostic data within a zoomed in or zoomed out display range, when receiving a zoom-in instruction or a zoom-out instruction sent by the user.

In order to describe the technical solutions in the present disclosure, the preset application are described with reference to specific embodiments below.

Embodiment I

Figure 1:
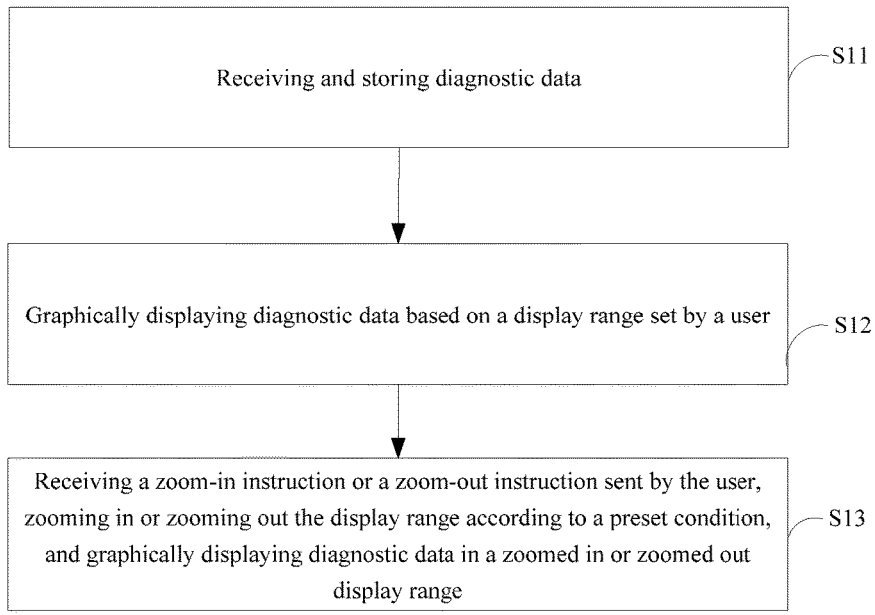
FIG. 1 is a schematic implementation flow chart of a method for graphically displaying a data stream provided by Embodiment I of the present disclosure.

FIG. 1 shows a schematic implementation flow chart of a method for graphically displaying a data stream according to Embodiment I of the present disclosure, which is described in detail below.

Step 11: receiving and storing diagnostic data.

In this embodiment provided in the present disclosure, a vehicle diagnostic device is connected to a vehicle ECU (Electronic Control Unit) in a wired manner, in a wireless manner, through an OBD (On-board Diagnostics) system interface, or in other manner. The vehicle diagnostic device receives, in real time, diagnostic data sent by the vehicle ECU. The diagnostic data is sent to the vehicle diagnostic device in a form of data stream. After receiving each piece of diagnostic data, the vehicle diagnostic device stores the diagnostic data in a data sequence based on a receiving order, and correspondingly records a storage number of the diagnostic data in the data sequence. Preferably, the vehicle diagnostic device may receive the diagnostic data at a frequency of one piece per second, and a corresponding storage number of the diagnostic data is corresponding to a receiving order of the diagnostic data.

Step 12, graphically display diagnostic data within a display range based on the display range set by a user.

In this embodiment provided in the present disclosure, the display range set by the user is obtained, and the diagnostic data is graphically displayed within the display range set by the user. The display range includes a maximum display range or a minimum display range. The graph includes a waveform graph, a line graph, and the like. Because that the display range of the vehicle diagnostic device includes the maximum display range and the minimum display range, the display range set by the user may be between the maximum display range and the minimum display range, or may be the same as one of the maximum display range and the minimum display range. For example, if the display range set by the user is [0-180], a waveform graph formed by 1st to 180th pieces of stored diagnostic data is displayed (diagnostic data corresponding to a position of which a serial number is 0 is displayed as 0).

Step 13, receiving a zoom-in instruction or a zoom-out instruction sent by the user, zoom in or zoom out the display range based on a preset condition, and graphically display diagnostic data within a zoomed in or zoomed out display range.

In this step, when the vehicle diagnostic device receives the zoom-in instruction or the zoom-out instruction sent by the user, the display range set by the user is zoomed in to a specific multiple or zoomed out to 1/N of an original display range, and then a graph of diagnostic data corresponding to the zoomed in or zoomed out display range is displayed.

Figure 2:
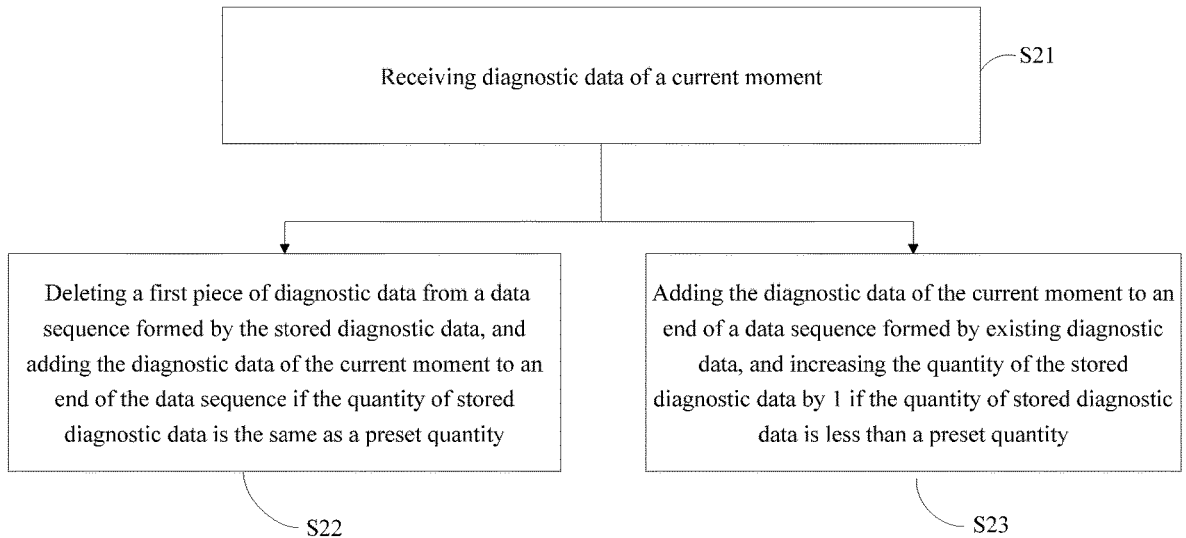
FIG. 2 is a schematic flow chart of receiving and storing diagnostic data provided by another embodiment of the present disclosure.

FIG. 2 shows a flowchart of receiving and storing diagnostic data according to another embodiment of the present disclosure, including:

step 21, receiving diagnostic data of a current moment.

In this step, a vehicle diagnostic device receives diagnostic data sent by a vehicle ECU at a current moment.

Step 22 deleting a first piece of diagnostic data from a data sequence formed by stored diagnostic data, and adding the diagnostic data of the current moment to an end of the data sequence, if the quantity of the stored diagnostic data is the same as a preset quantity.

In this step, after the currently sent diagnostic data is received, the quantity of received and stored diagnostic data is determined, so that a relationship between the quantity of the stored diagnostic data and the preset quantity is determined.

The preset quantity is the quantity of stored diagnostic data preset by the user according to performance of the vehicle diagnostic device. The preset quantity includes a maximum quantity of diagnostic data that can be simultaneously displayed by the vehicle diagnostic device at one display. A specific value of the preset quantity may be multiplication of Nth power of 2 with a minimum display quantity of diagnostic data that is displayed by the vehicle diagnostic device. For example, when the minimum display quantity of the vehicle diagnostic device is 180 pieces of diagnostic data, the preset quantity includes a quantity such as 360, 720, and 1440.

If the quantity of the stored diagnostic data is the same as the preset quantity set by the user, the piece of first stored diagnostic data is deleted from the stored data sequence, and the currently received diagnostic data is added to the end of the data sequence, so that the currently received diagnostic data is stored, and it is ensured that a total quantity of stored diagnostic data does not exceeds the preset quantity set by the user. In this case, a serial number of each piece of diagnostic data in the original data sequence is decreased by 1, and a serial number of the current diagnostic data is a value of the preset quantity.

For example, if the minimum display quantity of the vehicle diagnostic device is 180 pieces of diagnostic data, but the preset quantity set by the user is 1440 pieces of diagnostic data, and 1440 pieces of diagnostic data are stored in the data sequence, when diagnostic data is received again, a first piece of diagnostic data is deleted from the data sequence, and then a serial number of other diagnostic data in the data sequence is decreased by 1, and the currently received diagnostic data is stored as the 1440th piece of data in an end of the data sequence.

Step 23, adding the diagnostic data of the current moment to an end of a data sequence formed by the stored diagnostic data, and increasing the quantity of the stored diagnostic data by 1, if the quantity of the stored diagnostic data is less than the preset quantity.

Correspondingly, if the quantity of the stored diagnostic data is less than the preset quantity, the currently received diagnostic data is directly added to the end of the data sequence, and a serial number of the current diagnostic data is recorded. For example, when the preset quantity is 1440 and the quantity of the stored diagnostic data is 1000, the currently received diagnostic data is added as the $1001^{st}$ piece of data following the last piece of diagnostic data in the data sequence, and a serial number of the current diagnostic data is 1001. In addition, a total quantity of data in the data sequence is recorded as 1001.

Figure 3:
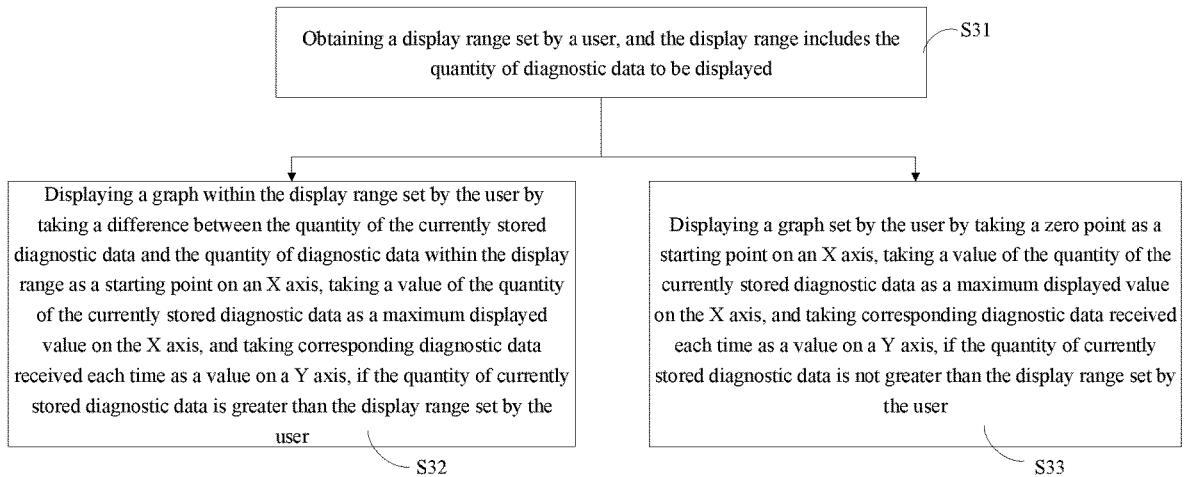
FIG. 3 is a schematic implementation flow chart of graphically displaying the diagnostic data in a display range based on the display range set by a user provided by another embodiment of the present disclosure.

FIG. 3 shows a flow chart of graphically displaying the diagnostic data within a display range based on the display range set by a user according to another embodiment of the present disclosure, including:

Step 31, obtaining a display range set by a user. The display range includes the quantity of diagnostic data to be displayed.

In this step, when received diagnostic data is to be graphically displayed, the display range set by the user is first obtained. The display range set by the user includes the quantity of the diagnostic data to be displayed. Alternatively, the display range may be a display range of a vehicle diagnostic device during initialization.

Step 32, displaying a graph within the display range set by the user by using a difference between the quantity of the currently stored diagnostic data and the quantity of diagnostic data within the display range as a starting point on an X axis, using a value of the quantity of the currently stored diagnostic data as a maximum displayed value on the X axis, and using corresponding diagnostic data received each time as a value on a Y axis, if the quantity of currently stored diagnostic data is greater than the display range set by the user.

In this step, when the stored diagnostic data is displayed in a form of a waveform graph or in a fold line graph, a relationship between the quantity of the stored diagnostic data and the display range set by the user is determined, such that a starting coordinate on the X axis in the displayed graph can be determined. In this case, if the quantity of the stored diagnostic data is greater than the quantity of data included in the display range set by the user, the difference between the quantity of the stored diagnostic data and the quantity of the data included in the display range is calculated, and the difference is used as the starting point on the X axis. In addition, a maximum serial number of the stored diagnostic data is used as the maximum displayed value on the X axis, and diagnostic data corresponding to each serial number within a range from the starting point on the X axis to the maximum displayed value is invoked and used as the value on the Y axis. In this way, a diagnostic data graph within a corresponding range is formed.

For example, when the quantity of the currently stored diagnostic data is 200 and the display range set by the user is [0, 180], after a difference is obtained according to the foregoing method, a display range of the X axis is [20, 200], and values of diagnostic data of which the serial numbers are between 20 and 200 are displayed on the Y axis.

Step 33, displaying a graph within the display range set by the user by using a zero point as a starting point on an X axis, using a value of the quantity of the currently stored diagnostic data as a maximum displayed value on the X axis, and using corresponding diagnostic data received each time as a value on a Y axis, if the quantity of currently stored diagnostic data is not greater than the display range set by the user.

In this step, if the quantity of the stored diagnostic data is not greater than the quantity of the data included in the display range, 0 is directly used as the starting point on the X axis, a maximum value of the display range set by the user is the maximum displayed value on the X axis, and diagnostic data with a corresponding serial number is used as the value on the Y axis, such that a graph for the stored diagnostic data is generated. If the quantity of the currently stored diagnostic data is 179, and the display range is [0, 180], the display range of the X axis is [0-180], and values of diagnostic data of which serial numbers are [0, 179] are on the Y axis (because that diagnostic data whose serial numbers are 0 or 180 are nonexistent, so the value on the Y axis is 0).

Figure 4:
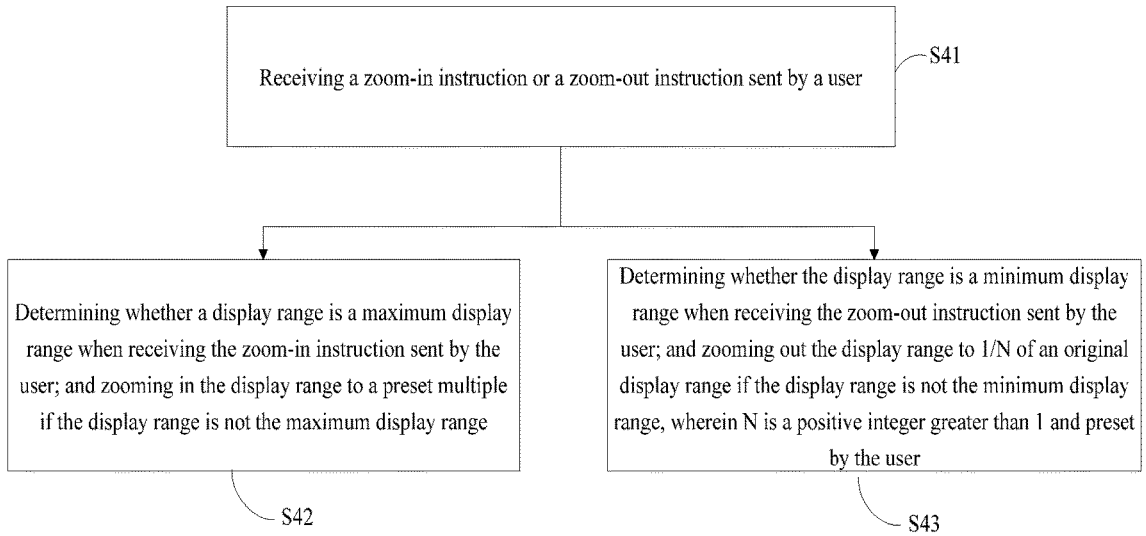
FIG. 4 is a schematic implementation flow chart of receiving a zoom-in instruction or a zoom-out instruction sent by the user and zooming in or zooming out the display range according to a preset condition provided by another embodiment of the present disclosure.

FIG. 4 shows a flow chart of receiving a zoom-in instruction or a zoom-out instruction sent by the user and zooming in or zooming out the display range according to a preset condition according to another embodiment of the present disclosure, including:

Step 41 receiving a zoom-in instruction or a zoom-out instruction sent by the user.

In this step, the user sends the zoom-in instruction or the zoom-out instruction to a vehicle diagnostic device in a preset manner, for example, the user sends the zoom-in instruction by double-clicking the vehicle diagnostic device, and sends the zoom-out instruction by sliding in a designated direction.

Step 42, determining whether the display range is a maximum display range when receiving the zoom-in instruction sent by the user; and zooming in the display range to a preset multiple if the display range is not the maximum display range.

In this step, if the zoom-in instruction sent by the user is received, whether the display range set by the user is the maximum display range is determined. If the display range is the maximum display range, the display range is not zoomed in, and an original graph is maintained. If the display range is not the maximum display range, the display range set by the user is zoomed in to N multiples of the original display range. N is a positive integer greater than 1 and set by the user. A zoomed in display range does not exceed the maximum display range.

For example, if the maximum display range is [0, 1440] and the display range set by the user is [0, 180], when the zoom-in instruction is received, the display range may be increased to [0, 360], [0, 720], or the like. If the display range set by the user is [0, 1440], the display range is not zoomed in.

Step 43, determining whether the display range is a minimum display range when receiving the zoom-out instruction sent by the user; and zooming out the display range to 1/N of an original display range if the display range is not the minimum display range, wherein N is a positive integer greater than 1 and preset by the user.

Similarly, if the zoom-out instruction sent by the user is received, whether the display range set by the user is the minimum display range is determined. If the display range is the minimum display range, the display range is not zoomed out, and the original graph is maintained. If the display range is not the minimum display range, the display range set by the user is zoomed out to 1/N of an original display range. N is a positive integer greater than 1 and set by the user. A zoomed out display range is not less than the minimum display range.

For example, if the minimum display range is [0, 180] and the display range set by the user is [0, 720], when the zoom-out instruction is received, the display range may be zoomed out to [0, 180] or [0, 360]. If the display range set by the user is [0-180], the display range is not zoomed out.

In a system for graphically displaying a data stream according to the embodiments of the present disclosure, a vehicle diagnostic device is connected to a vehicle, and receives diagnostic data sent by the automobile, and then obtains a display range set by a user, and graphically displays diagnostic data within the display range set by the user; when a zoom-in instruction or a zoom-out instruction sent by the user is received, the display range set by the user is zoomed in or zoomed out based on a condition preset by the user, and the diagnostic data within a zoomed in or zoomed out display range is displayed. In this process, the vehicle diagnostic device may store a large quantity of received diagnostic data and display diagnostic data of different areas in a graph within the range set by the user. In addition, the display range may be changed according to the zoom-in instruction or the zoom-out instruction of the user, so that the user can randomly zoom in and zoom out a displayed graph, which helps the user to comparatively look over different diagnostic data received within a long period of time so as to rapidly discover a fault or find a fault cause.

Embodiment II

Figure 5:
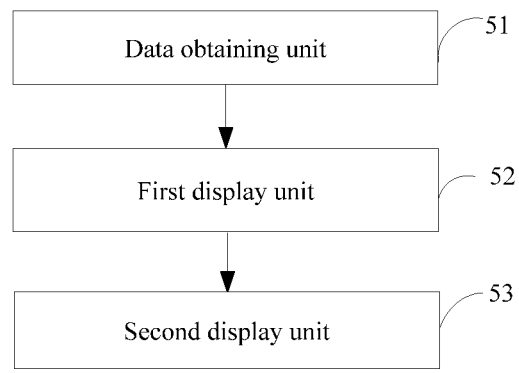
FIG. 5 is a schematic structural diagram of a system for graphically displaying a data stream provided by Embodiment II of the present disclosure.

Corresponding to the method for graphically displaying a data stream in the foregoing embodiments, FIG. 5 shows a schematic structural diagram of a system for graphically displaying a data stream according to an embodiment of the present disclosure. For the convenience of description, only a part related to the embodiment of the present disclosure is shown.

Referring to FIG. 5, the system for graphically displaying a data stream comprises: a data receiving unit 51, a first display unit 52, and a second display unit 53.

The data receiving unit 51 is configured to receive and store diagnostic data.

The first display unit 52 is configured to graphically display the diagnostic data within a display range based on the display range set by a user.

The second display unit 53 is configured to receive a zoom-in instruction or a zoom-out instruction sent by the user, zoom in or zoom out the display range based on a preset condition, and graphically display the diagnostic data within a zoomed in or zoomed out display range.

The data receiving unit 51 comprises:

a first storage module which is configured to: receive diagnostic data of a current moment; and delete a first piece of diagnostic data from a data sequence formed by the stored diagnostic data, and add the diagnostic data of the current moment to an end of the data sequence if the quantity of stored diagnostic data is the same as a preset quantity; and a second storage module which is configured to: add the diagnostic data of the current moment to an end of a data sequence formed by the stored diagnostic data, and increase the quantity of the stored diagnostic data by 1 if the quantity of stored diagnostic data is less than the preset quantity.

The first display unit 52 comprises:

an obtaining module which is configured to obtain the display range set by the user, wherein the display range includes the quantity of diagnostic data to be displayed; and a calculation module which is configured to: display a graph within the display range set by the user by taking a difference between the quantity of the currently stored diagnostic data and the quantity of diagnostic data within the display range as a starting point on an X axis, taking a value of the quantity of the currently stored diagnostic data as a maximum displayed value on the X axis, and taking corresponding diagnostic data received each time as a value on a Y axis, when the quantity of currently stored diagnostic data is greater than the display range set by the user.

a graphical display module configured to: display a graph within the display range set by the user by using a zero point as a starting point on an X axis, using a value of the quantity of the currently stored diagnostic data as a maximum displayed value on the X axis, and using corresponding diagnostic data received each time as a value on a Y axis, when the quantity of currently stored diagnostic data is not greater than the display range set by the user.

The second display unit 53 comprises:

an instruction receiving module which is configured to receive the zoom-in instruction or the zoom-out instruction sent by the user;

a zoom-in module which is configured to: determine whether the display range is a maximum display range when receiving the zoom-in instruction sent by the user; and zoom in the display range to a preset multiple if the display range is not the maximum display range; and a zoom-out module which is configured to: determine whether the display range is a minimum display range when receiving the zoom-out instruction sent by the user; and zoom out the display range to 1/N of an original display range if the display range is not the minimum display range, wherein N is a positive integer greater than 1 and preset by the user.

It should be understood that the magnitude of the serial numbers of the steps in the foregoing embodiment does not mean an execution sequence. The execution sequence of each of the processes is determined by functions and internal logic of the processes but should not be interpreted as any limitation to implementation processes of this embodiment of the present disclosure.

Embodiment III

Figure 6:
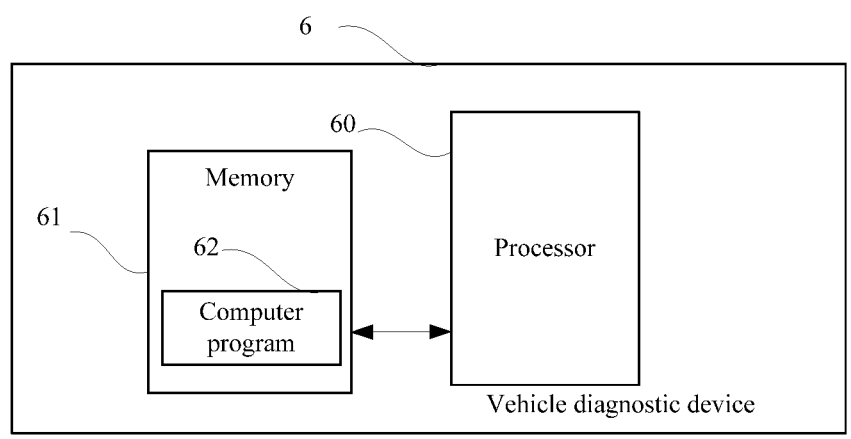
FIG. 6 is a schematic diagram of a vehicle diagnostic device provided by Embodiment III of the present disclosure.

FIG. 6 is a schematic diagram of a vehicle diagnostic device according to an embodiment of the present disclosure. As shown in FIG. 6, the vehicle diagnostic device 6 in this embodiment comprises: a processor 60, a memory 61, and a computer program 62 stored in the memory 61 and executable on the processor 60. The processor 60 is configured to execute the computer program 62 to implement steps of the method for graphically displaying a data stream in the aforesaid embodiments mentioned above, such as steps 11-13 in FIG. 1. As an alternative, the processor 60 is configured to execute the computer program 62 to implement functions of the modules/units in the device embodiments mentioned above, such as functions of the units 51 to 53 in FIG. 5.

For example, the computer program 62 may be divided into one or more modules/units. The one or more modules/units are stored in the memory 61 and performed by the processor 60 to implement the present disclosure. The one or more modules/units may be a series of computer program instruction segments that can perform a specific function. The instruction segments are used to describe an execution process of the computer program 62 in the vehicle diagnostic device 6. For example, the computer program 62 may be divided into: a data receiving unit, a first display unit, and a second display unit.

The data receiving unit is configured to receive and store diagnostic data.

The first display unit is configured to graphically display the diagnostic data within a display range based on the display range set by a user.

The second display unit is configured to receive a zoom-in instruction or a zoom-out instruction sent by the user, zoom in or zoom out the display range based on a preset condition, and graphically display the diagnostic data within a zoomed in or zoomed out display range.

The data receiving unit comprises:

a first storage module which is configured to: receive diagnostic data of a current moment; and delete a first piece of diagnostic data from a data sequence formed by the stored diagnostic data, and add the diagnostic data of the current moment to an end of the data sequence if the quantity of stored diagnostic data is the same as a preset quantity; and a second storage module which is configured to: add the diagnostic data of the current moment to an end of a data sequence formed by the stored diagnostic data, and increase the quantity of the stored diagnostic data by 1 if the quantity of stored diagnostic data is less than the preset quantity.

The first display unit comprises:

an obtaining module which is configured to obtain the display range set by the user, wherein the display range includes the quantity of diagnostic data to be displayed; and a calculation module which is configured to: display a graph within the display range set by the user by taking a difference between the quantity of the currently stored diagnostic data and the quantity of diagnostic data within the display range as a starting point on an X axis, taking a value of the quantity of the currently stored diagnostic data as a maximum displayed value on the X axis, and taking corresponding diagnostic data received each time as a value on a Y axis, when the quantity of currently stored diagnostic data is greater than the display range set by the user.

a graphical display module which is configured to: display a graph within the display range set by the user by using a zero point as a starting point on an X axis, using a value of the quantity of the currently stored diagnostic data as a maximum displayed value on the X axis, and using corresponding diagnostic data received each time as a value on a Y axis, when the quantity of currently stored diagnostic data is not greater than the display range set by the user.

The second display unit comprises:

an instruction receiving module which is configured to receive the zoom-in instruction or the zoom-out instruction sent by the user;

a zoom-in module which is configured to: determine whether the display range is a maximum display range when receiving the zoom-in instruction sent by the user; and zoom in the display range to a preset multiple if the display range is not the maximum display range; and a zoom-out module which is configured to determine whether the display range is a minimum display range when receiving the zoom-out instruction sent by the user; and zoom out the display range to 1/N of an original display range if the display range is not the minimum display range, wherein N is a positive integer greater than 1 and preset by the user.

The vehicle diagnostic device may include but is not limited to the processor 60 and the memory 61. The ordinarily skilled one in the art may understand that FIG. 6 is merely an example of the vehicle diagnostic device 6, and does not limit the vehicle diagnostic device 6. The vehicle diagnostic device may include more or less components than those shown in FIG. 6, or a combination of some of the components, or different components. For example, the vehicle diagnostic device may further include an input/output device, a network access device, a bus, and the like.

The processor 60 may be a CPU (Central Processing Unit), or may be another general purpose processor, DSP (Digital Signal Processor), ASIC (Application Specific Integrated Circuit), FPGA (Field-Programmable Gate Array, FPGA) or another programmable logic device, discrete gate or transistor logic device, discrete hardware assembly, or the like. The general purpose processor may be a microprocessor, or the processor may be any conventional processor, or the like.

The memory 61 may be an internal storage unit in the vehicle diagnostic device 6, for example, a hard disk or a memory in the vehicle diagnostic device 6. Alternatively, the memory 61 may be an external storage device for the vehicle diagnostic device 6, for example, a plug-in hard disk, a smart media card (Smart Media Card, SMC), a security digital (Secure Digital, SD) card, a flash card (Flash Card), or the like equipped in the vehicle diagnostic device 6. Further, the memory 61 may include both an internal storage unit in the vehicle diagnostic device 6 and an external storage device. The memory 61 is configured to store the computer program and another program and data required by the vehicle diagnostic device. The memory 61 may further configured to temporarily store data that has been output or that is to be output.

Embodiment IV

The present disclosure further provides a computer readable storage medium which stores a computer program, a processor is configured to execute the computer program to implement steps of receiving and storing diagnostic data; graphically displaying diagnostic data within a display range according to the display range set by a user; and receiving a zoom-in instruction or a zoom-out instruction sent by the user, zooming in or zooming out the display range according to a preset condition, and graphically displaying diagnostic data within a zoomed in or zoomed out display range.

In one embodiment, the processor is further configured to implement the step of receiving and storing diagnostic data by:

receiving diagnostic data of a current moment;

deleting a first piece of diagnostic data from a data sequence formed by a stored diagnostic data, and adding the diagnostic data of the current moment to an end of the data sequence if the quantity of the stored diagnostic data is the same as a preset quantity; and adding the diagnostic data of the current moment to an end of a data sequence formed by the stored diagnostic data and increasing the quantity of the stored diagnostic data by 1, if the quantity of the stored diagnostic data is less than the preset quantity.

In one embodiment, the processor is further configured to implement the step of graphically displaying the diagnostic data according to the display range set by a user by obtaining the display range set by the user, wherein the display range comprises the quantity of diagnostic data to be displayed; and displaying a graph set by the user by taking a difference between the quantity of the currently stored diagnostic data and the quantity of the diagnostic data in the display range as a starting point on an X axis, taking a value of the quantity of the currently stored diagnostic data as a maximum displayed value on the X axis, and taking corresponding diagnostic data received each time as a value on a Y axis, if the quantity of currently stored diagnostic data is greater than the display range set by the user.

In one embodiment, the processor is further configured to implement the step of graphically displaying the diagnostic data according to the display range set by a user by displaying a graph within the display range set by the user by taking a zero point as a starting point on an X axis, taking a value of the quantity of the currently stored diagnostic data as a maximum displayed value on the X axis, and taking corresponding diagnostic data received each time as a value on a Y axis, if a quantity of currently stored diagnostic data is not greater than the display range set by the user.

In one embodiment, the processor is further configured to implement the step of zooming in or zooming out the display range according to a preset condition by determining whether the display range is a maximum display range when receiving the zoom-in instruction sent by the user; and zooming in the display range to a preset multiple if the display range is not the maximum display range; or determining whether the display range is a minimum display range when receiving the zoom-out instruction sent by the user;

zooming out the display range to 1/N of an original display range if the display range is not the minimum display range, where N is a positive integer greater than 1 and preset by the user.

It can be clearly understood by the ordinarily skilled one in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either implemented in the form of hardware or in the form of software functional units. In addition, specific names of the various functional units and modules are only used for distinguishing from each other conveniently, but not intended to limit the protection scope of the present disclosure. Regarding a specific working process of the units and modules in the aforesaid device, reference can be made to a corresponding process in the aforesaid method embodiments, it is not repeatedly described herein.

In the aforesaid embodiments, the description of each of the embodiments is emphasized respectively, regarding a part of one embodiment which is not described or disclosed in detail, please refer to relevant descriptions in some other embodiments.

The ordinarily skilled one in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present disclosure.

It should be understood that, in the embodiments of the present disclosure, the disclosed device/vehicle diagnostic equipment and method could be implemented in other ways. For example, the device/vehicle diagnostic equipment described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present disclosure can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present disclosure can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can comprise: any entity or device that can carry the computer program codes, recording medium, USB flash disk, mobile hard disk, hard disk, optical disk, computer storage device, ROM (Read-Only Memory), RAM (Random Access Memory), and software distribution medium, etc.

What is claimed is:

1. A method for graphically displaying a data stream, being performed on a vehicle diagnostic device, comprising:
    receiving and storing diagnostic data sent from a vehicle ECU (Electronic Control Unit) by the vehicle diagnostic device through an OBD (On-board Diagnostics) system interface;

graphically displaying, by the vehicle diagnostic device, diagnostic data within a display range according to the display range set by a user; and receiving a zoom-in instruction or a zoom-out instruction sent by the user, zooming in or zooming out the display range according to a preset condition, and graphically displaying diagnostic data within a zoomed in or zoomed out display range by the vehicle diagnostic device;

wherein the step of graphically displaying, by the vehicle diagnostic device, the diagnostic data according to the display range set by a user comprises:

obtaining the display range set by the user, wherein the display range comprises the quantity of diagnostic data to be displayed; and displaying the diagnostic data in a form of graph in the display range set by the user by the vehicle diagnostic device by taking a difference between the quantity of the currently stored diagnostic data and the quantity of the diagnostic data in the display range as a starting point on an X axis, taking a value of the quantity of the currently stored diagnostic data as a maximum displayed value on the X axis, and taking corresponding diagnostic data received each time as a value on a Y axis, if the quantity of currently stored diagnostic data is greater than the quantity of diagnostic data in the display range set by the user.

2. The method for graphically displaying a data stream according to claim 1, wherein the step of receiving and storing diagnostic data sent from the vehicle ECU by the vehicle diagnostic device through the OBD system interface comprises:

receiving diagnostic data of a current moment from the vehicle ECU;

deleting a first piece of diagnostic data from a data sequence formed by a stored diagnostic data, and adding the diagnostic data of the current moment to an end of the data sequence by the vehicle diagnostic device, if the quantity of the stored diagnostic data is the same as a preset quantity;

adding the diagnostic data of the current moment to an end of a data sequence formed by the stored diagnostic data and increasing the quantity of the stored diagnostic data by 1 by the vehicle diagnostic device, if the quantity of the stored diagnostic data is less than the preset quantity.

3. The method for graphically displaying a data stream according to claim 1, wherein the step of graphically displaying the diagnostic data within the display range by the vehicle diagnostic device based on the display range set by the user comprises:

displaying the diagnostic data in a form of graph in the display range set by the user by taking a zero point as a starting point on an X axis, taking a value of the quantity of the currently stored diagnostic data as a maximum displayed value on the X axis, and taking corresponding diagnostic data received each time as a value on a Y axis, if a quantity of currently stored diagnostic data is not greater than the display range set by the user.

4. The method for graphically displaying a data stream according to claim 1, wherein the step of zooming in or zooming out the display range by the vehicle diagnostic device according to a preset condition comprises:

determining, by the vehicle diagnostic device, whether the display range is a maximum display range when receiving the zoom-in instruction sent by the user; and zooming in the display range to a preset multiple by the vehicle diagnostic device, if the display range is not the maximum display range; or determining whether the display range is a minimum display range when receiving the zoom-out instruction sent by the user; and zooming out the display range to 1/N of an original display range by the vehicle diagnostic device, if the display range is not the minimum display range, wherein N is a positive integer greater than 1 and preset by the user.

5. A vehicle diagnostic device, comprising: a non-transitory memory, a processor, and a computer program stored in the memory and executable on the processor, wherein the processor is configured to: receive and store diagnostic data; graphically display diagnostic data within a display range according to the display range set by a user; and receive a zoom-in instruction or a zoom-out instruction sent by the user, zooming in or zooming out the display range according to a preset condition, and graphically display diagnostic data within a zoomed in or zoomed out display range;

wherein the processor is further configured to: display the diagnostic data according to the display range set by a user by obtaining the display range set by the user, wherein the display range comprises the quantity of diagnostic data to be displayed; and display the diagnostic data in a form of graph in the display range set by the user by taking a difference between the quantity of the currently stored diagnostic data and the quantity of the diagnostic data in the display range as a starting point on an X axis, taking a value of the quantity of the currently stored diagnostic data as a maximum displayed value on the X axis, and taking corresponding diagnostic data received each time as a value on a Y axis, if the quantity of currently stored diagnostic data is greater than the quantity of diagnostic data in the display range set by the user.

6. The vehicle diagnostic device according to claim 5, wherein the processor is further configured to implement the step of receiving and storing diagnostic data by:

receiving diagnostic data of a current moment;

deleting a first piece of diagnostic data from a data sequence formed by a stored diagnostic data, and adding the diagnostic data of the current moment to an end of the data sequence if the quantity of the stored diagnostic data is the same as a preset quantity;

adding the diagnostic data of the current moment to an end of a data sequence formed by the stored diagnostic data and increasing the quantity of the stored diagnostic data by 1, if the quantity of the stored diagnostic data is less than the preset quantity.

7. The vehicle diagnostic device according to claim 5, wherein the processor is further configured to implement the step of graphically displaying the diagnostic data according to the display range set by a user by displaying a graph within the display range set by the user by: taking a zero point as a starting point on an X axis, taking a value of the quantity of the currently stored diagnostic data as a maximum displayed value on the X axis, and taking corresponding diagnostic data received each time as a value on a Y axis, if a quantity of currently stored diagnostic data is not greater than the display range set by the user.

8. The vehicle diagnostic device according to claim 5, wherein the processor is further configured to implement the step of graphically displaying the diagnostic data according to the display range set by a user by displaying a graph within the display range set by the user by: taking a zero point as a starting point on an X axis, taking a value of the quantity of the currently stored diagnostic data as a maximum displayed value on the X axis, and taking corresponding diagnostic data received each time as a value on a Y axis, if a quantity of currently stored diagnostic data is not greater than the display range set by the user.

9. The vehicle diagnostic device according to claim 5, wherein the processor is further configured to implement the step of zooming in or zooming out the display range according to a preset condition by:
  determining whether the display range is a maximum display range when receiving the zoom-in instruction sent by the user; and
  zooming in the display range to a preset multiple if the display range is not the maximum display range; or
  determining whether the display range is a minimum display range when receiving the zoom-out instruction sent by the user; and
  zooming out the display range to 1/N of an original display range if the display range is not the minimum display range, wherein N is a positive integer greater than 1 and preset by the user.

10. A non-transitory computer readable storage medium wherein the computer readable storage medium stores a computer program, when the computer program is executed by a processor, the processor is caused to implement steps of receiving and storing diagnostic data; graphically displaying diagnostic data within a display range according to the display range set by a user; and receiving a zoom-in instruction or a zoom-out instruction sent by the user, zooming in or zooming out the display range according to a preset condition, and graphically displaying diagnostic data within a zoomed in or zoomed out display range;
  wherein the processor is further caused to, when executing the computer program, implement the step of graphically displaying the diagnostic data according to the display range set by a user by:
    obtaining the display range set by the user, wherein the display range comprises the quantity of diagnostic data to be displayed; and
    displaying the diagnostic data in a form of graph in the display range set by the user by taking a difference between the quantity of the currently stored diagnostic data and the quantity of the diagnostic data in the display range as a starting point on an X axis, taking a value of the quantity of the currently stored diagnostic data as a maximum displayed value on the X axis, and taking corresponding diagnostic data received each time as a value on a Y axis, if the quantity of currently stored diagnostic data is greater than the quantity of diagnostic data in the display range set by the user.

11. The non-transitory computer readable storage medium according to claim 10, wherein the processor is further caused to, when executing the computer program, implement the step of receiving and storing diagnostic data by:
  receiving diagnostic data of a current moment;
  deleting a first piece of diagnostic data from a data sequence formed by a stored diagnostic data, and adding the diagnostic data of the current moment to an end of the data sequence if the quantity of the stored diagnostic data is the same as a preset quantity; and
  adding the diagnostic data of the current moment to an end of a data sequence formed by the stored diagnostic data and increasing the quantity of the stored diagnostic data by 1, if the quantity of the stored diagnostic data is less than the preset quantity.

12. The non-transitory computer readable storage medium according to claim 10, wherein the processor is further caused to, when executing the computer program, implement the step of graphically displaying the diagnostic data according to the display range set by a user by displaying a graph within the display range set by the user by taking a zero point as a starting point on an X axis, taking a value of the quantity of the currently stored diagnostic data as a maximum displayed value on the X axis, and taking corresponding diagnostic data received each time as a value on a Y axis, if a quantity of currently stored diagnostic data is not greater than the display range set by the user.

13. The non-transitory computer readable storage medium according to claim 10, wherein the processor is further caused to, when executing the computer program, implement the step of graphically displaying the diagnostic data according to the display range set by a user by displaying a graph within the display range set by the user by taking a zero point as a starting point on an X axis, taking a value of the quantity of the currently stored diagnostic data as a maximum displayed value on the X axis, and taking corresponding diagnostic data received each time as a value on a Y axis, if a quantity of currently stored diagnostic data is not greater than the display range set by the user.

14. The non-transitory computer readable storage medium according to claim 10, wherein the processor is further caused to, when executing the computer program, implement the step of zooming in or zooming out the display range according to a preset condition by:
  determining whether the display range is a maximum display range when receiving the zoom-in instruction sent by the user; and
  zooming in the display range to a preset multiple if the display range is not the maximum display range; or
  determining whether the display range is a minimum display range when receiving the zoom-out instruction sent by the user; and
  zooming out the display range to 1/N of an original display range if the display range is not the minimum display range, wherein N is a positive integer greater than 1 and preset by the user.

* * * * *